United States Patent
Nakahara et al.

(10) Patent No.: US 12,500,616 B2
(45) Date of Patent: Dec. 16, 2025

(54) RADIO COMMUNICATION DEVICE, RADIO COMMUNICATION METHOD, AND PROGRAM

(71) Applicant: Sony Group Corporation, Tokyo (JP)

(72) Inventors: Fumito Nakahara, Tokyo (JP); Shunsuke Akiyama, Tokyo (JP); Yuta Nakamura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 291 days.

(21) Appl. No.: 18/006,156

(22) PCT Filed: Aug. 21, 2020

(86) PCT No.: PCT/JP2020/031692
§ 371 (c)(1),
(2) Date: Jan. 20, 2023

(87) PCT Pub. No.: WO2022/038782
PCT Pub. Date: Feb. 24, 2022

(65) Prior Publication Data
US 2023/0318635 A1    Oct. 5, 2023

(51) Int. Cl.
*H04B 5/00* (2024.01)
*H04B 1/02* (2006.01)
*H04B 5/20* (2024.01)
*H04B 5/77* (2024.01)
*H04B 5/45* (2024.01)

(52) U.S. Cl.
CPC .............. *H04B 1/02* (2013.01); *H04B 5/20* (2024.01); *H04B 5/77* (2024.01); *H04B 5/45* (2024.01)

(58) Field of Classification Search
CPC ... H04B 1/02; H04B 5/77; H04B 5/00; H04B 5/0056
See application file for complete search history.

(56) References Cited

U.S. PATENT DOCUMENTS

| 7,634,239 B2 * | 12/2009 | Stoddard | H04B 1/713 379/27.04 |
| 8,081,123 B2 * | 12/2011 | Yang | H01Q 21/10 343/702 |
| 2017/0361113 A1 | 12/2017 | Aghassian | |
| 2018/0034510 A1 | 2/2018 | Hueber | |

(Continued)

FOREIGN PATENT DOCUMENTS

| JP | 2012-209749 A | 10/2012 |
| JP | 2013-201751 A | 10/2013 |

(Continued)

OTHER PUBLICATIONS

International Search Report and Written Opinion mailed on Oct. 13, 2020, received for PCT Application PCT/JP2020/031692, filed on Aug. 21, 2020, 8 pages including English Translation.

*Primary Examiner* — Tuan H Nguyen
(74) *Attorney, Agent, or Firm* — XSENSUS LLP

(57) ABSTRACT

In a radio communication device, a radio communication module transmits a radio signal, and a CPU sets a phase, a modulation depth, and transmission power of the radio signal based on a resonance frequency in the radio communication module, a received signal strength indicator in the radio communication module, and a temperature in the radio communication device.

20 Claims, 10 Drawing Sheets

(56) References Cited

U.S. PATENT DOCUMENTS

2019/0074914 A1 3/2019 Hueber
2019/0097459 A1 3/2019 Ettes

FOREIGN PATENT DOCUMENTS

| JP | 2015-142208 A | 8/2015 |
| JP | 2018-23097 A | 2/2018 |
| WO | 2018/037698 A1 | 3/2018 |

* cited by examiner

FIG.3

| MODULE RESONANCE FREQUENCY freq[Hz] | RESPONSE SIGNAL PHASE [degree] |
|---|---|
| . | . |
| . | . |
| . | . |
| FA≤freq<FB | PA |
| FB≤freq<FC | PB |
| FC≤freq<FD | PC |
| FD≤freq<FE | PD |
| FE≤freq<FF | PE |
| FF≤freq<FG | PF |
| . | . |
| . | . |
| . | . |

| MODULE RESONANCE FREQUENCY freq[Hz] | MODULATION DEPTH [%] |
|---|---|
| . | . |
| . | . |
| . | . |
| FA≤freq<FB | MA |
| FB≤freq<FC | MB |
| FC≤freq<FD | MC |
| FD≤freq<FE | MD |
| FE≤freq<FF | ME |
| FF≤freq<FG | MF |
| . | . |
| . | . |
| . | . |

FIG.5

| RECEIVED SIGNAL STRENGTH INDICATOR RSSI[dBm] | TRANSMISSION POWER [dBm] |
|---|---|
| . | . |
| . | . |
| . | . |
| RA≤RSSI<RB | VA |
| RB≤RSSI<RC | VB |
| RC≤RSSI<RD | VC |
| RD≤RSSI<RE | VD |
| RE≤RSSI<RF | VE |
| RF≤RSSI<RG | VF |
| . | . |
| . | . |
| . | . |

FIG.6

| R/W TYPE | MODULE RESONANCE FREQUENCY freq[Hz] | RESPONSE SIGNAL PHASE [degree] | MODULATION DEPTH [%] |
|---|---|---|---|
| | . | . | . |
| | . | . | . |
| | . | . | . |
| RWA | FA≤freq<FB | PA1 | MA1 |
| | FB≤freq<FC | PB1 | MB1 |
| | FC≤freq<FD | PC1 | MC1 |
| | FD≤freq<FE | PD1 | MD1 |
| | FE≤freq<FF | PE1 | ME1 |
| | FF≤freq<FG | PF1 | MF1 |
| | . | . | . |
| | . | . | . |
| | . | . | . |

| R/W TYPE | MODULE RESONANCE FREQUENCY freq[Hz] | RESPONSE SIGNAL PHASE [degree] | MODULATION DEPTH [%] |
|---|---|---|---|
| RWB | . | . | . |
| | . | . | . |
| | . | . | . |
| | FA≤freq<FB | PA2 | MA2 |
| | FB≤freq<FC | PB2 | MB2 |
| | FC≤freq<FD | PC2 | MC2 |
| | FD≤freq<FE | PD2 | MD2 |
| | FE≤freq<FF | PE2 | ME2 |
| | FF≤freq<FG | PF2 | MF2 |
| | . | . | . |
| | . | . | . |
| | . | . | . |

| DEVICE TEMPERATURE temp[°C] | MODULE RESONANCE FREQUENCY freq[Hz] | RESPONSE SIGNAL PHASE [degree] | MODULATION DEPTH [%] |
|---|---|---|---|
| . | . | . | . |
| . | . | . | . |
| . | . | . | . |
| 20≤temp<25 | FA≤freq<FB | PA | MA |
| 20≤temp<25 | FB≤freq<FC | PB | MB |
| 20≤temp<25 | FC≤freq<FD | PC | MC |
| 25≤temp<30 | FA≤freq<FB | PD | MD |
| 25≤temp<30 | FB≤freq<FC | PE | ME |
| 25≤temp<30 | FC≤freq<FD | PF | MF |
| . | . | . | . |
| . | . | . | . |
| . | . | . | . |

FIG.9

| R/W TYPE | DEVICE TEMPERATURE temp[°C] | MODULE RESONANCE FREQUENCY freq[Hz] | RECEIVED SIGNAL STRENGTH INDICATOR RSSI[dBm] | RESPONSE SIGNAL PHASE [degree] | MODULATION DEPTH [%] | TRANSMISSION POWER [dBm] ≤TH1 |
|---|---|---|---|---|---|---|
| | | | | . | . | . |
| | | | | . | . | . |
| | | | | . | . | . |
| | | FA≤freq<FB | RA≤RSSI<RB | PA1 | MA1 | VA1 |
| | | | RB≤RSSI<RC | PA2 | MA2 | VA2 |
| | | | RC≤RSSI<RD | PA3 | MA3 | VA3 |
| | 20≤temp<25 | FB≤freq<FC | RA≤RSSI<RB | PB1 | MB1 | VB1 |
| | | | RB≤RSSI<RC | PB2 | MB2 | VB2 |
| | | | RC≤RSSI<RD | PB3 | MB3 | VB3 |
| | | FC≤freq<FD | RA≤RSSI<RB | PC1 | MC1 | VC1 |
| RWA | | | RB≤RSSI<RC | PC2 | MC2 | VC2 |
| | | | RC≤RSSI<RD | PC3 | MC3 | VC3 |
| | | FA≤freq<FB | RA≤RSSI<RB | PD1 | MD1 | VD1 |
| | | | RB≤RSSI<RC | PD2 | MD2 | VD2 |
| | | | RC≤RSSI<RD | PD3 | MD3 | VD3 |
| | 25≤temp<30 | FB≤freq<FC | RA≤RSSI<RB | PE1 | ME1 | VE1 |
| | | | RB≤RSSI<RC | PE2 | ME2 | VE2 |
| | | | RC≤RSSI<RD | PE3 | ME3 | VE3 |
| | | FC≤freq<FD | RA≤RSSI<RB | PF1 | MF1 | VF1 |
| | | | RB≤RSSI<RC | PF2 | MF2 | VF2 |
| | | | RC≤RSSI<RD | PF3 | MF3 | VF3 |
| | | | | . | . | . |
| | | | | . | . | . |
| | | | | . | . | . |

FIG.10

| R/W TYPE | DEVICE TEMPERATURE temp[°C] | MODULE RESONANCE FREQUENCY freq[Hz] | RECEIVED SIGNAL STRENGTH INDICATOR RSSI[dBm] | RESPONSE SIGNAL PHASE [degree] | MODULATION DEPTH [%] | TRANSMISSION POWER [dBm] ≤TH2 |
|---|---|---|---|---|---|---|
| RWB | . | . | . | . | . | . |
| | . | . | . | . | . | . |
| | 20≤temp<25 | FA≤freq<FB | RA≤RSSI<RB | PG1 | MG1 | VG1 |
| | | | RB≤RSSI<RC | PG2 | MG2 | VG2 |
| | | | RC≤RSSI<RD | PG3 | MG3 | VG3 |
| | | FB≤freq<FC | RA≤RSSI<RB | PH1 | MH1 | VH1 |
| | | | RB≤RSSI<RC | PH2 | MH2 | VH2 |
| | | | RC≤RSSI<RD | PH3 | MH3 | VH3 |
| | | FC≤freq<FD | RA≤RSSI<RB | PI1 | MI1 | VI1 |
| | | | RB≤RSSI<RC | PI2 | MI2 | VI2 |
| | | | RC≤RSSI<RD | PI3 | MI3 | VI3 |
| | 25≤temp<30 | FA≤freq<FB | RA≤RSSI<RB | PJ1 | MJ1 | VJ1 |
| | | | RB≤RSSI<RC | PJ2 | MJ2 | VJ2 |
| | | | RC≤RSSI<RD | PJ3 | MJ3 | VJ3 |
| | | FB≤freq<FC | RA≤RSSI<RB | PK1 | MK1 | VK1 |
| | | | RB≤RSSI<RC | PK2 | MK2 | VK2 |
| | | | RC≤RSSI<RD | PK3 | MK3 | VK3 |
| | | FC≤freq<FD | RA≤RSSI<RB | PL1 | ML1 | VL1 |
| | | | RB≤RSSI<RC | PL2 | ML2 | VL2 |
| | | | RC≤RSSI<RD | PL3 | ML3 | VL3 |
| | . | . | . | . | . | . |
| | . | . | . | . | . | . |
| | . | . | . | . | . | . |

RADIO COMMUNICATION DEVICE, RADIO COMMUNICATION METHOD, AND PROGRAM

CROSS-REFERENCE TO RELATED APPLICATION

This application is based on PCT filing PCT/JP2020/031692, filed Aug. 21, 2020, the entire contents of which are incorporated herein by reference.

FIELD

The present disclosure relates to a radio communication device, a radio communication method, and a program.

BACKGROUND

In recent years, a mobile radio communication device (hereinafter, sometimes referred to as a "mobile communication device") that is equipped with a radio communication module incorporating a contactless integrated circuit (IC) chip or the like and capable of performing contactless communication with a reader/writer at a short distance has become widespread. Known examples of contactless communication systems that achieves communication between a mobile communication device and a reader/writer include an electronic money system and a ticket gate system for transportation.

CITATION LIST

Patent Literature

Patent Literature 1: JP 2013-201751 A
Patent Literature 2: JP 2015-142208 A
Patent Literature 3: JP 2012-209749 A

SUMMARY

Technical Problem

The resonance frequency in the radio communication module embedded in the mobile communication device changes for each radio communication module due to variations in performance of components constituting the radio communication module. In addition, the optimum phase of a radio signal transmitted from the mobile communication device to the reader/writer changes according to the resonance frequency in the radio communication module. Therefore, when the phase of the radio signal deviates from the optimum phase due to the change in the resonance frequency, it is difficult to maintain the communication characteristics of the mobile communication device.

In view of this, the present disclosure proposes a technology capable of maintaining communication characteristics of a radio communication device.

Solution to Problem

In one aspect of the disclosed embodiment, a radio communication device includes a radio communication module and a CPU. The radio communication module transmits a radio signal. The CPU that sets a phase of the radio signal based on a resonance frequency in the radio communication module.

BRIEF DESCRIPTION OF DRAWINGS

FIG. 3 is a diagram illustrating an example of a table according to the first embodiment of the present disclosure.

FIG. 4 is a diagram illustrating an example of a table according to a second embodiment of the present disclosure.

FIG. 5 is a diagram illustrating an example of a table according to a third embodiment of the present disclosure.

FIG. 6 is a diagram illustrating an example of a table according to a fourth embodiment of the present disclosure.

FIG. 7 is a diagram illustrating an example of a table according to the fourth embodiment of the present disclosure.

FIG. 8 is a diagram illustrating an example of a table according to a fifth embodiment of the present disclosure.

FIG. 9 is a diagram illustrating an example of a table according to a sixth embodiment of the present disclosure.

FIG. 10 is a diagram illustrating an example of a table according to the sixth embodiment of the present disclosure.

DESCRIPTION OF EMBODIMENTS

Embodiments of the present disclosure will be described below with reference to the drawings. In each of the following embodiments, the same parts of processes are denoted by the same reference signs, and a repetitive description thereof will be omitted in some cases.

The technology of the present disclosure will be described in the following order.
First Embodiment
 <Configuration of radio communication system>
 <Configuration of mobile communication device>
 <Operation of mobile communication device>
Second Embodiment
 <Operation of mobile communication device>
Third Embodiment
 <Operation of mobile communication device>
Fourth Embodiment
 <Operation of mobile communication device>
 <Determination of R/W Type>
 <Determination Example 1>
 <Determination Example 2>
Fifth Embodiment
 <Operation of mobile communication device>
Sixth Embodiment
 <Operation of mobile communication device>
Seventh Embodiment
 <Operation of mobile communication device>
[Eighth embodiment]
[Effects of the disclosed technology]

First embodiment

<Configuration of Radio Communication System>

Figure 1:
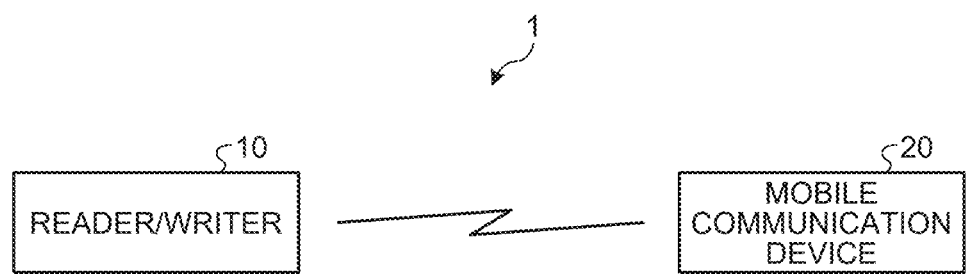
FIG. 1 is a diagram illustrating a configuration example of a radio communication system according to a first embodiment of the present disclosure.

FIG. 1 is a diagram illustrating a configuration example of a radio communication system according to a first embodiment of the present disclosure. In FIG. 1, a radio communication system 1 includes a reader/writer 10 and a mobile communication device 20. The mobile communication device 20 communicates with the reader/writer 10 using a short-range radio communication technology such as near field communication (NFC), for example. For example, the reader/writer 10 transmits a carrier signal of 13.56 [MHz]. The mobile communication device 20 receives the carrier signal transmitted from the reader/writer 10, and in response to the received carrier signal, transmits a response signal, which is a radio signal generated by load modulation, to the reader/writer 10. The reader/writer 10 receives the response signal transmitted from the mobile communication device 20. Examples of the mobile communication device 20 include smart devices such as a smartphone and a tablet terminal.

<Configuration of Mobile Communication Device>

Figure 2:
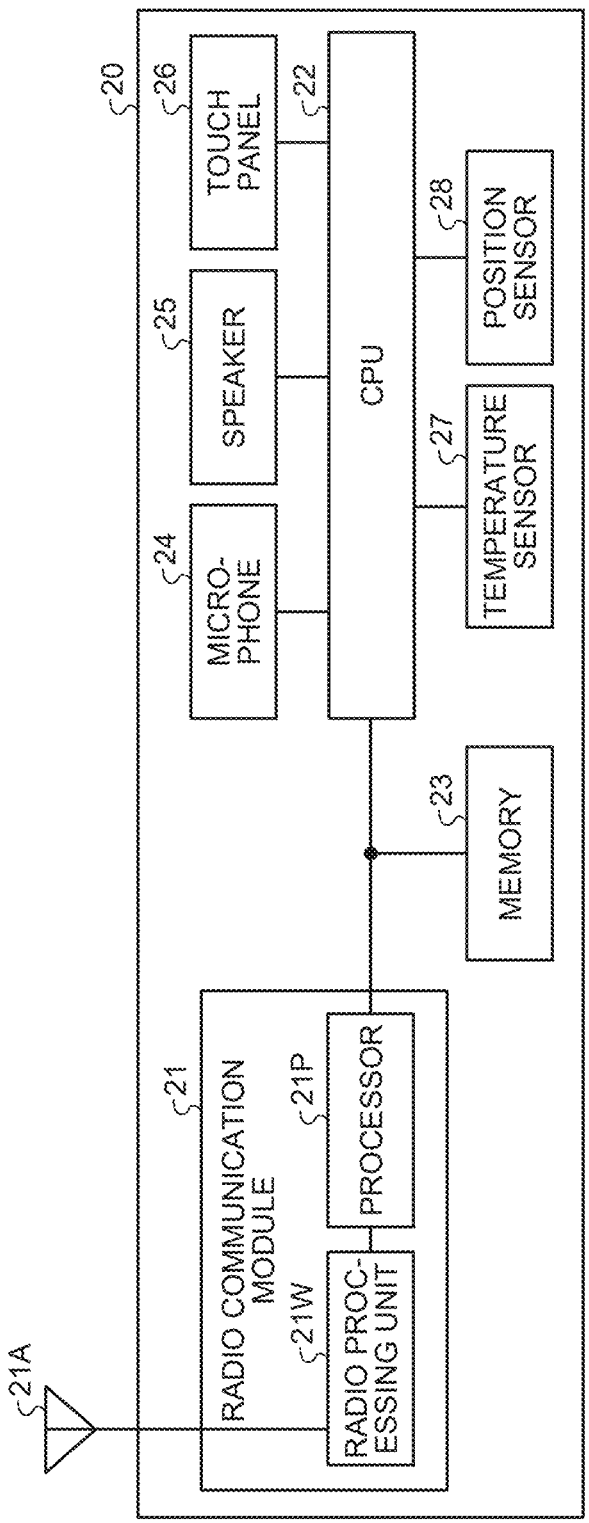
FIG. 2 is a diagram illustrating a configuration example of a mobile communication device according to the first embodiment of the present disclosure.

FIG. 2 is a diagram illustrating a configuration example of the mobile communication device according to the first embodiment of the present disclosure. In FIG. 2, the mobile communication device 20 includes a radio communication module 21, a central processing unit (CPU) 22, memory 23, a microphone 24, a speaker 25, a touch panel 26, a temperature sensor 27, and a position sensor 28. The radio communication module 21 includes an antenna 21A, a radio processing unit 21W, and a processor 21P. Examples of the processor 21P include a digital signal processor (DSP) and a field programmable gate array (FPGA). The radio processing unit 21W includes a matching circuit (not illustrated) that performs matching with the antenna 21A.

<Operation of Mobile Communication Device>

The carrier signal transmitted from the reader/writer 10 is received by the radio communication module 21 via the antenna 21A of the mobile communication device 20.

By performing load modulation under the control of the processor 21P, the radio processing unit 21W in the radio communication module 21 generates a response signal for the carrier signal received via the antenna 21A and transmits the generated response signal to the reader/writer 10 via the antenna 21A. The radio processing unit 21W generates the response signal by performing load modulation on the carrier signal using an Amplitude Shift Keying (ASK) modulation scheme.

The memory 23 preliminarily stores data (hereinafter, sometimes referred to as "resonance frequency data") indicating a resonance frequency in the radio communication module 21 (hereinafter, sometimes referred to as "module resonance frequency"). The module resonance frequency is determined by the configurations of the antenna 21A and the radio processing unit 21W. In addition, the module resonance frequency is measured in advance at the time of a shipment inspection performed before shipping of the mobile communication device 20.

In addition, the memory 23 preliminarily stores a table that has set the association between the module resonance frequency [Hz] and the phase (hereinafter, sometimes referred to as a "response signal phase") [degree] of the response signal transmitted from the radio communication module 21. FIG. 3 is a diagram illustrating an example of a table according to the first embodiment of the present disclosure. As illustrated in FIG. 3, a table TA has set a plurality of ranges of the module resonance frequency and an optimum response signal phase for each range of the module resonance frequency in association with each other. In the table TA, for example, the optimum response signal phase when the module resonance frequency is FA or more and lower than FB is PA; the optimum response signal phase when the module resonance frequency is FB or more and lower than FC is PB; and the optimum response signal phase when the module resonance frequency is FC or more and lower than FD is PC.

Here, the response signal phase in the table TA may be either a fixed value or a variable value that changes according to the module resonance frequency. When the response signal phase in the table TA is a variable value, each response signal phase in the table TA is set as a function of the module resonance frequency.

The CPU 22 acquires the resonance frequency data from the memory 23. Based on the module resonance frequency indicated by the acquired resonance frequency data, the CPU 22 refers to the table TA and acquires the response signal phase corresponding to the module resonance frequency from the table TA. For example, when the module resonance frequency is FA or more and lower than FB, a response signal phase of "PA" is acquired. When the module resonance frequency is FB or more and lower than FC, a response signal phase of "PB" is acquired. When the module resonance frequency is FC or more and lower than FD, a response signal phase of "PC" is acquired. The CPU 22 instructs the processor 21P to set the response signal phase acquired in this manner in the radio processing unit 21W.

In accordance with the instruction from the CPU 22, the processor 21P sets the response signal phase acquired from the table TA by the CPU 22 in the radio processing unit 21W. With this operation, an optimum response signal phase corresponding to the module resonance frequency is set in the radio processing unit 21W.

The radio processing unit 21W generates a response signal having a response signal phase set by the processor 21P, and transmits the generated response signal to the reader/writer 10 via the antenna 21A. The reader/writer 10 receives the response signal transmitted from the radio processing unit 21W.

The first embodiment has been described as above.

Second Embodiment

<Operation of Mobile Communication Device>

Differences from the first embodiment will be described below.

The optimum modulation depth of the response signal transmitted from the mobile communication device 20 to the reader/writer 10 also changes according to the module resonance frequency.

Corresponding to this, the memory 23 preliminarily stores a table that has set the association between the module resonance frequency [Hz] and the modulation depth [%] of the load modulation performed in the radio processing unit 21W. FIG. 4 is a diagram illustrating an example of a table according to a second embodiment of the present disclosure. As illustrated in FIG. 4, a table TB has set a plurality of ranges of the module resonance frequency and an optimum modulation depth for each range of the module resonance frequency in association with each other. In the table TB, for example, the optimum modulation depth when the module resonance frequency is FA or more and lower than FB is MA; the optimum modulation depth when the module resonance frequency is FB or more and lower than FC is MB; and the optimum modulation depth when the module resonance frequency is FC or more and lower than FD is MC.

Here, the modulation depth in the table TB may be either a fixed value or a variable value that changes according to the module resonance frequency. When the modulation depth in the table TB is a variable value, each modulation depth in the table TB is set as a function of the module resonance frequency.

The CPU 22 acquires the resonance frequency data from the memory 23. Based on the module resonance frequency indicated by the acquired resonance frequency data, the CPU 22 refers to the table TB and acquires the modulation depth corresponding to the module resonance frequency from the table TB. For example, when the module resonance frequency is FA or more and lower than FB, a modulation depth of "MA" is acquired. When the module resonance frequency is FB or more and lower than FC, a modulation depth of "MB" is acquired. When the module resonance frequency is FC or more and lower than FD, a modulation depth of "MC" is acquired. The CPU 22 instructs the processor 21P to set the modulation depth acquired in this manner in the radio processing unit 21W.

In accordance with the instruction from the CPU 22, the processor 21P sets the modulation depth acquired from the table TB by the CPU 22 in the radio processing unit 21W. With this operation, the optimum modulation depth according to the module resonance frequency is set in the radio processing unit 21W.

The radio processing unit 21W generates a response signal that has undergone load modulation with the modulation depth set by the processor 21P, and transmits the generated response signal to the reader/writer 10 via the antenna 21A. The reader/writer 10 receives the response signal transmitted from the radio processing unit 21W.

The second embodiment has been described as above.

Third Embodiment

<Operation of Mobile Communication Device>

Differences from the first and second embodiments will be described below.

In the radio communication module 21, the radio processing unit 21W measures a received signal strength indicator [dBm] of the carrier signal received via the antenna 21A, and outputs a measurement result of the received signal strength indicator to the processor 21P. The processor 21P notifies the CPU 22 of the measurement result of the received signal strength indicator.

According to an estimate, the lower the received signal strength indicator, the longer the distance between the reader/writer 10 and the mobile communication device 20.

Correspondingly, the memory 23 preliminarily stores a table that has set the association between the received signal strength indicator of the carrier signal and the transmission power [dBm] of the response signal transmitted from the radio communication module 21. FIG. 5 is a diagram illustrating an example of a table according to a third embodiment of the present disclosure. As illustrated in FIG. 5, a table TC has set a plurality of ranges of the received signal strength indicator and optimum transmission power for each range of the received signal strength indicator in association with each other. In the table TC, for example, the optimum transmission power when the received signal strength indicator is RA or more and lower than RB is VA, the optimum transmission power when the received signal strength indicator is RB or more and lower than RC is VB, and the optimum transmission power when the received signal strength indicator is RC or more and lower than RD is VC. Incidentally, each transmission power in the table TC has a relationship of "VA>VB>VC>VD>VE>VF". That is, the lower the received signal strength indicator of the carrier signal, the higher the optimum transmission power of the response signal.

Here, the transmission power in the table TC may be either a fixed value or a variable value that changes according to the received signal strength indicator. When the transmission power in the table TC is a variable value, each transmission power in the table TC is set as a function of the received signal strength indicator.

The CPU 22 refers to the table TC based on the received signal strength indicator notified from the processor 21P, thereby acquiring the transmission power corresponding to the received signal strength indicator from the table TC. For example, when the received signal strength indicator is RA or more and lower than RB, transmission power of "VA" is acquired. When the received signal strength indicator is RB or more and lower than RC, transmission power of "VB" is acquired. When the received signal strength indicator is RC or more and lower than RD, transmission power of "VC" is acquired. The CPU 22 instructs the processor 21P to set the transmission power acquired in this manner in the radio processing unit 21W.

In accordance with the instruction from the CPU 22, the processor 21P sets the transmission power acquired from the table TC by the CPU 22 in the radio processing unit 21W. With this operation, optimum transmission power according to the received signal strength indicator is set in the radio processing unit 21W.

The radio processing unit 21W transmits a response signal to the reader/writer 10 via the antenna 21A with the transmission power set by the processor 21P. The reader/writer 10 receives the response signal transmitted from the radio processing unit 21W.

The third embodiment has been described as above.

Fourth Embodiment

<Operation of Mobile Communication Device>

Differences from the first to third embodiments will be described below.

The memory 23 preliminarily stores a table that has set the association among the module resonance frequency, the response signal phase, and the modulation depth of the load modulation performed in the radio processing unit 21W, for each type of the reader/writer 10.

FIGS. 6 and 7 are diagrams illustrating an example of a table according to a fourth embodiment of the present disclosure. FIG. 6 illustrates a table TD1 for the reader/writer 10, in which the type of the reader/writer 10 that has transmitted the carrier signal to the mobile communication device 20, that is, the type of the reader/writer 10 that receives the response signal transmitted from the mobile communication device 20 (hereinafter, also referred to as an "R/W type") is "RWA". FIG. 7 illustrates a table TD2 for the reader/writer 10, in which the R/W type is "RWB".

An example of the reader/writer 10 with the R/W type "RWA" is a reader/writer 10 for Suica (registered trademark), and an example the reader/writer 10 with the R/W type "RWB" is a reader/writer 10 for Edy (registered trademark).

As illustrated in FIGS. 6 and 7, the tables TD1 and TD2 have set a plurality of ranges of the module resonance frequency, an optimum response signal phase for each range of the module resonance frequency, and an optimum modulation depth for each range of the module resonance frequency in association with each other for each R/W type. In the table TD1 (FIG. 6), for example, the optimum response signal phase and modulation depth when the module resonance frequency is FA or more and lower than FB are PA1 and MA1, the optimum response signal phase and modulation depth when the module resonance frequency is FB or more and lower than FC are PB1 and MB1, and the optimum response signal phase and modulation depth when the module resonance frequency is FC or more and lower than FD are PC1 and MC1, respectively. On the other hand, in the table TD2 (FIG. 7), for example, the optimum response signal phase and modulation depth when the module resonance frequency is FA or more and lower than FB are PA2 and MA2, the optimum response signal phase and modulation depth when the module resonance frequency is FB or more and lower than FC are PB2 and MB2, and the optimum response signal phase and modulation depth when the module resonance frequency is FC or more and lower than FD are PC2 and MC2, respectively. In this manner, the optimum response signal phase and modulation depth for the same module resonance frequency differ depending on the R/W type.

The CPU 22 determines the type of the reader/writer 10 that has transmitted the carrier signal to the mobile communication device 20. Furthermore, the CPU 22 acquires the resonance frequency data from the memory 23.

The CPU 22 refers to either the table TD1 or the table TD2 based on the module resonance frequency indicated by the acquired resonance frequency data, and acquires the response signal phase and the modulation depth corresponding to the module resonance frequency from the table TD1 or the table TD2. The CPU 22 refers to the table TD1 when having determined that the R/W type is "RWA", and refers to the table TD2 when having determined that the R/W type is "RWB". Subsequently, the CPU 22 instructs the processor 21P to set the acquired response signal phase and modulation depth in the radio processing unit 21W.

In accordance with the instruction from the CPU 22, the processor 21P sets the response signal phase and the modulation depth acquired from the table TD1 or the table TD2 by the CPU 22 in the radio processing unit 21W. With this operation, the optimum response signal phase and modulation depth corresponding to the module resonance frequency are set in the radio processing unit 21W for each R/W type.

The radio processing unit 21W generates a response signal having the response signal phase set by the processor 21P and subjected to load modulation with the modulation depth set by the processor 21P, and transmits the generated response signal to the reader/writer 10 via the antenna 21A. The reader/writer 10 receives the response signal transmitted from the radio processing unit 21W.

<Determination of R/W Type>

Hereinafter, two determination examples of Determination Example 1 and Determination Example 2 will be exemplified for the determination of the R/W type. The CPU 22 determines the R/W type as in the following Determination Example 1 or Determination Example 2.

<Determination Example 1>

The R/W type can be specified by a location where the reader/writer 10 is installed (hereinafter, may be referred to as a "reader/writer installation location"). For example, the reader/writer 10 for Suica (registered trademark) with the R/W type "RWA" is mainly installed at a ticket gate of a station, while the reader/writer 10 for Edy (registered trademark) with the R/W type "RWB" is mainly installed at a specific store.

Furthermore, when the mobile communication device 20 communicates with the reader/writer 10, the mobile communication device 20 is located in the vicinity of the reader/writer 10.

Accordingly, the R/W type of the reader/writer 10 being communicating with the mobile communication device 20 can be determined by detecting the current position of the mobile communication device 20 (hereinafter, sometimes referred to as a "mobile communication device position").

Correspondingly, the memory 23 preliminarily stores a table TE that has set the association between the R/W type and the reader/writer installation location. In the table TE, the reader/writer installation location is registered to the table TE as information using latitude and longitude, for example. The position sensor 28 detects the position of the mobile communication device, and outputs the detected position of the mobile communication device to the CPU 22. The position of the mobile communication device is detected as information using latitude and longitude, for example. The position sensor 28 detects the position of the mobile communication device using a global positioning system (GPS), for example.

The CPU 22 determines the R/W type by referring to the table TE based on the position of the mobile communication device detected by the position sensor 28. In the table TE, the CPU 22 specifies the reader/writer installation location within a predetermined range from the position of the mobile communication device, and determines the R/W type corresponding to the specified reader/writer installation location as the R/W type of the reader/writer 10 that has transmitted the carrier signal to the mobile communication device 20. For example, the CPU 22 determines the R/W type of the reader/writer 10 existing within a radius of 5 meters from the position of the mobile communication device.

<Determination Example 2>

When the mobile communication device 20 communicates with the reader/writer 10, application software (hereinafter, sometimes referred to as an "application") used to generate data included in the response signal differs for each R/W type. For example, an application for Suica (registered trademark) with the R/W type "RWA" and an application for Edy (registered trademark) with the R/W type "RWB" are different from each other.

Correspondingly, the memory 23 preliminarily stores a table TF that has set the association between the R/W type and application identification information. The CPU 21 specifies an application being executed in the CPU 21 among applications used for communication with the reader/writer 10. The CPU 21 refers to the table TF based on the identification information of the specified application and determines the R/W type corresponding to the identification information of the application as the R/W type of the reader/writer 10 that has transmitted the carrier signal to the mobile communication device 20.

The fourth embodiment has been described as above.

Fifth Embodiment

<Operation of Mobile Communication Device>

Differences from the first to fourth embodiments will be described below.

The optimum phase and optimum modulation depth of the response signal transmitted from the mobile communication device 20 to the reader/writer 10 also vary with the temperature.

Therefore, the temperature sensor 27 detects a temperature in the mobile communication device 20 (hereinafter, sometimes referred to as a "device temperature") and outputs a detection result to the CPU 22. The temperature sensor 27 detects the device temperature at regular time intervals.

The memory 23 preliminarily stores a table that has set the association among the device temperature [C], the module resonance frequency, the response signal phase, and the modulation depth of the load modulation performed in the radio processing unit 21W. FIG. 8 is a diagram illustrating an example of a table according to a fifth embodiment of the present disclosure. As illustrated in FIG. 5, a table TG has set a plurality of ranges of the device temperature, a plurality of ranges of the module resonance frequency, a response signal phase optimum for each of the ranges of the device temperature and the module resonance frequency, and an optimum modulation depth for each of the ranges of the device temperature and the module resonance frequency, in association with each other. In the table TG, when the device temperature is 20 [° C.] or more and less than 25 [° C.] and the module resonance frequency is FA or more and less than FB, for example, the optimum response signal phase and modulation depth are PA and MA, respectively. On the other hand, when the device temperature is 25 [° C.] or more and less than 30 [° C.] and the module resonance frequency is FA or more and less than FB, the optimum response signal phase and modulation depth are PD and MD, respectively. In this manner, the optimum response signal phase and modulation depth for the same module resonance frequency vary depending on the device temperature.

The CPU 22 refers to the table TG based on the device temperature detected by the temperature sensor 27 and the module resonance frequency indicated by the resonance frequency data acquired from the memory 23, thereby acquiring the response signal phase and the modulation depth corresponding to the device temperature and the module resonance frequency from the table TG. For example, when the device temperature is 20 [ ° C.] or more and less than 25 [ ° C.] and the module resonance frequency is FA or more and less than FB, the response signal phase of "PA" and the modulation depth of "MA" are acquired. When the device temperature is 25 [° C.] or higher and lower than 30 [° C.] and the module resonance frequency is FA or higher and lower than FB, the response signal phase of "PD" and the modulation depth of "MD" are acquired. The CPU 22 instructs the processor 21P to set the response signal phase and the modulation depth acquired in this manner in the radio processing unit 21W.

In accordance with the instruction from the CPU 22, the processor 21P sets the response signal phase and the modulation depth acquired from the table TG by the CPU 22 in the radio processing unit 21W. With this operation, the optimum response signal phase and modulation depth corresponding to the device temperature and the module resonance frequency are set in the radio processing unit 21W.

The radio processing unit 21W generates a response signal having the response signal phase set by the processor 21P and subjected to load modulation with the modulation depth set by the processor 21P, and transmits the generated response signal to the reader/writer 10 via the antenna 21A. The reader/writer 10 receives the response signal transmitted from the radio processing unit 21W.

Note that the CPU 22 may have a configuration in which the response signal phase and the modulation depth set in the radio processing unit 21W are to be changed only when the amount of change in the device temperature in a predetermined time (hereinafter, sometimes referred to as "device temperature change amount") is a threshold or more, while the response signal phase and the modulation depth already set in the radio processing unit 21W are to be maintained when the device temperature change amount is less than the threshold.

The fifth embodiment has been described as above.

Sixth Embodiment

<Operation of Mobile Communication Device>

Some of the first to fifth embodiments may be appropriately combined in implementation. For example, the memory 23 preliminarily stores a table that has set the association among the device temperature, the module resonance frequency, the received signal strength indicator, the response signal phase, the modulation depth of the load modulation performed in the radio processing unit 21W, and the transmission power of the response signal transmitted from the radio communication module 21, for each type of the reader/writer 10. FIGS. 9 and 10 are diagrams illustrating an example of a table according to a sixth embodiment of the present disclosure. FIG. 9 illustrates a table TH1 for the reader/writer 10 having the R/W type "RWA"; FIG. 10 illustrates a table TH2 for the reader/writer 10 having the R/W type "RWB".

As illustrated in FIGS. 9 and 10, the tables TH1 and TH2 have each set a plurality of ranges of the device temperature, a plurality of ranges of the module resonance frequency, a plurality of ranges of the received signal strength indicator, as well as the response signal phase, the modulation depth, and the transmission power optimal for each of the ranges of the device temperature, the module resonance frequency, and the received signal strength indicator, in association with each other for each R/W type.

The CPU 22 determines the R/W type. Furthermore, the CPU 22 acquires the device temperature from the temperature sensor 27, acquires the resonance frequency data indicating the module resonance frequency from the memory 23, and acquires the measurement result of the received signal strength indicator from the processor 21P.

The CPU 22 refers to either the table TH1 or the table TH2 based on the device temperature, the module resonance frequency, and the received signal strength indicator, thereby acquiring the response signal phase, the modulation depth, and the transmission power corresponding to the device temperature, the module resonance frequency, and the received signal strength indicator, from the table TH1 or the table TH2. The CPU 22 refers to the table TH1 when having determined that the R/W type is "RWA", and refers to the table TH2 when having determined that the R/W type is "RWB". Subsequently, the CPU 22 instructs the processor 21P to set the acquired response signal phase, the modulation depth, and the transmission power in the radio processing unit 21W.

In accordance with the instruction from the CPU 22, the processor 21P sets the response signal phase, the modulation depth, and the transmission power, acquired from the table TH1 or the table TH2 by the CPU 22, in the radio processing unit 21W. With this operation, the optimum response signal phase, modulation depth, and transmission power according to the device temperature, the module resonance frequency, and the received signal strength indicator, are set in the radio processing unit 21W for each R/W type.

The radio processing unit 21W generates a response signal having the response signal phase set by the processor 21P and subjected to load modulation with the modulation depth set by the processor 21P, and transmits, via the antenna 21A, the generated response signal to the reader/writer 10 using the transmission power set by the processor 21P. The reader/writer 10 receives the response signal transmitted from the radio processing unit 21W.

The sixth embodiment has been described as above.

Seventh Embodiment

<Operation of Mobile Communication Device>

Differences from the first embodiment will be described below.

In the first embodiment, the module resonance frequency is measured in advance at the time of a shipment inspection before shipment of the mobile communication device 20, and resonance frequency data indicating the module resonance frequency measured at the time of the shipment inspection is preliminarily stored in the memory 23.

In contrast, a seventh embodiment uses a configuration in which the processor 21P measures the module resonance frequency that changes from time to time, under an instruction from the CPU 22. The CPU 22 outputs an instruction to measure the module resonance frequency to the processor 21P. The CPU 22 outputs a measurement instruction to the processor 21P at regular time intervals, for example. In accordance with the measurement instruction from the CPU 22, the processor 21P measures the module resonance frequency in the radio processing unit 21W and outputs the measurement result to the CPU 22. The CPU 22 refers to the table TA similarly to the first embodiment based on the measurement result of the module resonance frequency, thereby acquiring the response signal phase corresponding to the module resonance frequency from the table TA. The CPU 22 instructs the processor 21P to set the response signal phase acquired from the table TA in the radio processing unit 21W.

In accordance with the instruction from the CPU 22, the processor 21P sets the response signal phase acquired from the table TA by the CPU 22 in the radio processing unit 21W. With this operation, an optimum response signal phase corresponding to the module resonance frequency is set in the radio processing unit 21W.

The radio processing unit 21W generates a response signal having a response signal phase set by the processor 21P, and transmits the generated response signal to the reader/writer 10 via the antenna 21A. The reader/writer 10 receives the response signal transmitted from the radio processing unit 21W.

When the difference between the module resonance frequency measured at the time of the shipment inspection and the module resonance frequency measured by the processor 21P is a threshold or more, the CPU 22 may determine that an object (for example, metal or the like) that affects the module resonance frequency is present around the mobile communication device 20 and maintain the response signal phase already set in the radio processing unit 21W.

In addition, the measurement of the module resonance frequency in the seventh embodiment can be used not only in place of the acquisition of the resonance frequency data in the first embodiment but also in place of the acquisition in the second and fourth to sixth embodiments.

The seventh embodiment has been described as above.

Eighth Embodiment

All or part of each processing in the above description of the CPU 22 may be implemented by causing the CPU 22 to execute a program corresponding to each processing. For example, a program corresponding to each processing in the above description may be stored in memory 23, and the program may be read from the memory 23 and executed by the CPU 22. Furthermore, the program may be stored in a program server connected to the mobile communication device 20 via a certain network and downloaded from the program server to the mobile communication device 20 to be executed, or may be stored in a recording medium readable by the mobile communication device 20 and read from the recording medium to be executed. The recording medium readable by the mobile communication device 20 includes, for example, a mobile storage medium such as a memory card, a USB drive, an SD card, a flexible disk, a magneto-optical disk, a CD-ROM, a DVD, and a Blu-ray (registered trademark) disk. In addition, the program may use a data processing method described in an arbitrary language or an arbitrary description method, and the program may be written in any format, such as a source code or a binary code. In addition, the program is not necessarily limited to a single program, and includes a program configured in distributed programs as a plurality of modules or a plurality of libraries, and a program that achieves its own function in cooperation with a separate program represented by an OS.

The eighth embodiment has been described as above.

[Effects of the Disclosed Technology]

As described above, the radio communication device (the mobile communication device 20 of the embodiment) of the present disclosure includes the radio communication module (the radio communication module 21W of the embodiment) and the CPU (the CPU 22 of the embodiment). The radio communication module transmits a radio signal (the response signal of the embodiment). The CPU sets the phase of the radio signal (the response signal phase of the embodiment) based on the resonance frequency of the radio communication module (the module resonance frequency of the embodiment).

With this configuration, the phase of the radio signal transmitted by the radio communication device can be automatically set to the optimum phase according to the resonance frequency in the radio communication module, making it possible to maintain the communication characteristics of the radio communication device. In addition, the radio communication device does not have to include an additional component such as a variable capacitor for adjusting the resonance frequency to a resonance frequency at which an optimum phase can be obtained, making it possible downsize the radio communication device. Furthermore, since the phase of the radio signal can be automatically set to an optimum phase according to the resonance frequency in the radio communication module, there is no need to perform calibration conventionally performed at the time of shipment of the radio communication device.

In addition, the CPU further sets the modulation depth of the radio signal based on the resonance frequency in the radio communication module.

With this configuration, the modulation depth of the radio signal transmitted by the radio communication device can be automatically set to the optimum modulation depth according to the resonance frequency in the radio communication module, making it possible to maintain the communication characteristics of the radio communication device.

Furthermore, the CPU further sets the transmission power of the radio signal based on the received signal strength indicator in the radio communication module.

With this configuration, the transmission power of the radio signal transmitted by the radio communication device can be automatically set to the optimum transmission power according to the received signal strength indicator, making it possible to maintain the communication characteristics of the radio communication device.

Furthermore, the CPU sets the phase of the radio signal based on the resonance frequency in the radio communication module and the temperature in the radio communication device (the device temperature of the embodiment).

With this configuration, the phase of the radio signal transmitted by the radio communication device can be automatically set to the optimum phase according to the temperature change, making it possible to maintain the communication characteristics of the radio communication device.

In addition, the CPU sets the phase of the radio signal based on the resonance frequency in the radio communication module and the type (R/W type in the embodiment) of the device (the reader/writer 10 in the embodiment) that receives the radio signal transmitted using the radio communication module.

For example, the CPU determines the type of the device that receives the radio signal based on the current position of the radio communication device (the mobile communication device position of the embodiment).

In addition, for example, the CPU determines a type of a device that receives a radio signal based on an application during execution, which is used to generate data included in the radio signal.

In this manner, the phase of the radio signal transmitted by the radio communication device can be automatically set to the optimum phase according to the type of the device that receives the radio signal. This makes it possible to maintain the communication characteristics of the radio communication device regardless of the type of the device that receives the radio signal.

The effects described in the present specification are merely examples, and thus, there may be other effects, not limited to the exemplified effects.

Furthermore, the disclosed technology can also adopt the following configurations.

(1)
A radio communication device comprising:
a radio communication module that transmits a radio signal; and
a CPU that sets a phase of the radio signal based on a resonance frequency in the radio communication module.

(2)
The radio communication device according to (1),
wherein the CPU further sets a modulation depth of the radio signal based on the resonance frequency.

(3)
The radio communication device according to (1),
wherein the CPU further sets transmission power of the radio signal based on a received signal strength indicator in the radio communication module.

(4)
The radio communication device according to (1),
wherein the CPU sets the phase based on the resonance frequency and a type of a device that receives the radio signal transmitted by using the radio communication module.

(5)
The radio communication device according to (4), further comprising
a position sensor that detects a current position of the radio communication device,
wherein the CPU determines the type based on the current position.

(6)
The radio communication device according to (4),
wherein the CPU determines the type based on application software under execution which is used to generate data included in the radio signal.

(7)
The radio communication device according to (1), further comprising
a temperature sensor that detects a temperature in the radio communication device,
wherein the CPU sets the phase based on the resonance frequency and the temperature.

(8)
A radio communication method comprising:
setting a phase of a radio signal based on a resonance frequency in a radio communication module; and
transmitting the radio signal having the phase by using the radio communication module.

(9)
A program for causing a CPU to execute processing comprising:
acquiring a resonance frequency in a radio communication module that transmits a radio signal; and
setting a phase of the radio signal based on the resonance frequency.

REFERENCE SIGNS LIST

1 RADIO COMMUNICATION SYSTEM
10 READER/WRITER
20 MOBILE COMMUNICATION DEVICE
21 RADIO COMMUNICATION MODULE
21A ANTENNA
21W RADIO PROCESSING UNIT
21P PROCESSOR
22 CPU
23 MEMORY
27 TEMPERATURE SENSOR
28 POSITION SENSOR

The invention claimed is:

1. A radio communication device comprising:
a radio communication module that transmits a radio signal;
a memory that stores one or more table that associates a plurality of resonance frequencies with a plurality of corresponding phase settings; and
a CPU configured to:
acquire resonance frequency data indicating a resonance frequency in the radio communication module,
refer to the one or more table to determine a phase setting corresponding to the resonance frequency in the radio communication module, and
set a phase of the radio signal based on the phase setting corresponding to the resonance frequency in the radio communication module.

2. The radio communication device according to claim 1, wherein the CPU is configured to set a modulation depth of the radio signal based on the resonance frequency in the radio communication module.

3. The radio communication device according to claim 1, wherein the CPU is configured to set a transmission power of the radio signal based on a received signal strength indicator in the radio communication module.

4. The radio communication device according to claim 1, wherein the CPU is configured to set the phase based on the phase setting corresponding to the resonance frequency in the radio communication module and a type of a device that receives the radio signal transmitted by using the radio communication module.

5. The radio communication device according to claim 4, further comprising
   a position sensor configured to detect a current position of the radio communication device,
   wherein the CPU is configured to determine the type based on the current position of the radio communication device.

6. The radio communication device according to claim 4, wherein the CPU is configured to determine the type based on application software under execution which is used to generate data included in the radio signal transmitted by using the radio communication module.

7. The radio communication device according to claim 1, further comprising
   a temperature sensor configured to detect a temperature in the radio communication device,
   wherein the CPU sets the phase based on the resonance frequency and the temperature.

8. The radio communication device according to claim 1, wherein
   the one or more table associates the plurality of resonance frequencies with a plurality of corresponding modulation depth settings, and
   the CPU is configured to:
      refer to the one or more table to determine a modulation depth setting corresponding to the resonance frequency in the radio communication module, and
      set a modulation depth of the radio signal based on the modulation depth setting corresponding to the resonance frequency in the radio communication module.

9. The radio communication device according to claim 1, wherein
   the one or more table associates a plurality of signal strength indicators with a plurality of corresponding transmission power settings, and
   the CPU is configured to:
      determine a received signal strength indicator in the radio communication module,
      refer to the one or more table to determine a transmission power setting corresponding to the received signal strength indicator in the radio communication module, and
      set a transmission power of the radio signal based on the transmission power setting corresponding to the received signal strength indicator in the radio communication module.

10. The radio communication device according to claim 9, wherein
   the plurality of signal strength indicators in the one or more table includes a plurality of ranges of signal strength indicators, and
   the one or more table associates the plurality of ranges of signal strength indicators with the plurality of corresponding transmission power settings.

11. The radio communication device according to claim 1, wherein
   the one or more table associates the plurality of resonance frequencies with a plurality of corresponding types of a device, and
   the CPU is configured to:
      determine a type of a device that receives the radio signal transmitted by using the radio communication module,
      refer to the one or more table to determine a phase setting corresponding to the resonance frequency in the radio communication module and the type of the device that receives the radio signal transmitted by using the radio communication module, and
      set the phase of the radio signal based on the phase setting corresponding to the resonance frequency in the radio communication module and the type of the device that receives the radio signal transmitted by using the radio communication module.

12. The radio communication device according to claim 11, further comprising
   a position sensor configured to detect a current position of the radio communication device,
   wherein the CPU is configured to determine the type of the device that receives the radio signal transmitted by using the radio communication module based on the current position of the radio communication device.

13. The radio communication device according to claim 11, wherein the CPU is configured to determine the type of the device that receives the radio signal transmitted by using the radio communication module based on application software under execution which is used to generate data included in the radio signal transmitted by using the radio communication module.

14. The radio communication device according to claim 11, wherein
   the plurality of resonance frequencies in the one or more table includes a plurality of ranges of resonance frequencies, and
   the one or more table associates the plurality of ranges of resonance frequencies with the plurality of corresponding types of the device.

15. The radio communication device according to claim 1, further comprising
   a temperature sensor configured to detect a temperature in the radio communication device, wherein
   the one or more table associates a plurality of temperatures with the plurality of corresponding phase settings, and
   the CPU is configured to:
      refer to the one or more table to determine a phase setting corresponding to the resonance frequency in the radio communication module and the temperature in the radio communication device, and
      set the phase of the radio signal based on the phase setting corresponding to the resonance frequency in the radio communication module and the temperature in the radio communication device.

16. The radio communication device according to claim 15, wherein
   the plurality of temperatures in the one or more table includes a plurality of ranges of temperatures, and
   the one or more table associates the plurality of ranges of temperatures with the plurality of corresponding phase settings.

17. The radio communication device according to claim 1, wherein
   the plurality of resonance frequencies in the one or more table includes a plurality of ranges of resonance frequencies, and
   the one or more table associates the plurality of ranges of resonance frequencies with the plurality of corresponding phase settings.

18. The radio communication device according to claim 1, wherein the memory stores the resonance frequency data.

19. A radio communication method comprising:
- acquiring resonance frequency data indicating a resonance frequency in a radio communication module:
- referring to one or more table that associates a plurality of resonance frequencies with a plurality of corresponding phase settings to determine a phase setting corresponding to the resonance frequency in the radio communication module;
- setting a phase of a radio signal based on the phase setting corresponding to the resonance frequency in the radio communication module; and
- transmitting the radio signal having the phase by using the radio communication module.

20. A non-transitory computer readable medium storing a program for causing a CPU to execute processing comprising:
- acquiring resonance frequency data indicating a resonance frequency in a radio communication module that transmits a radio signal;
- referring to one or more table that associates a plurality of resonance frequencies with a plurality of corresponding phase settings to determine a phase setting corresponding to the resonance frequency in the radio communication module; and
- setting a phase of the radio signal based on the phase setting corresponding to the resonance frequency in the radio communication module.

* * * * *